United States Patent Office 3,423,326
Patented Jan. 21, 1969

3,423,326
ZINC TELLURITE GLASSES
Michael J. Redman, Belmont, Mass., assignor to Kennecott Copper Corporation, New York, N.Y., a corporation of New York
Filed Feb. 20, 1967, Ser. No. 617,362
U.S. Cl. 252—301.6                3 Claims
Int. Cl. C09k 1/04; C03c 3/28

ABSTRACT OF THE DISCLOSURE

A glass having high dielectric constant, density and refractive index, and particularly suitable as a laser host, giving secondary emissions at $1.06\mu$ when doped with Nd, is composed of ZnO and $TeO_2$.

---

This invention consists in a novel glass composition consisting essentially of tellurium oxide and zinc oxide, characterized by a high dielectric constant, density and refractive index. Glasses of this formulation are useful for optical and instrumental purposes and are also extremely well suited as laser host materials. When doped with a rare earth metal, strong fluorescence is observed, at $1.06\mu$ when the additive is $Nd_2O_3$.

When either tellurium oxide or zinc oxide is melted and cooled below its melting point, neither solidifies to a vitreous glass, but each rather crystallizes. We have found that mixtures containing minor molar fractional amounts of ZnO, when melted and cooled, form a clear amorphous glass composition. Specifically best results are obtained with mixtures containing between about 20 and 40 percent ZnO (molar). Mixtures containing smaller and larger amounts of ZnO also exhibit glass-like properties but it should be noted that at 50% ZnO a crystalline compound $ZnTeO_3$ is formed. The precise limits of ZnO content can readily be determined by routine experimentation within the guidelines set forth herein.

The glasses of the instant invention are specifically characterized by a density of about 5.35 gr./cc., a refractive index of about 2.0 (5892 A., 23° C.), a dielectric constant as shown in Table I. Dielectric loss and A.C. resistivities are set forth in Table II.

TABLE I.—DIELECTRIC CONSTANTS OF ZINC TELLURITE GLASSES

| Sample, mol percent $TeO_2$ | Temperature (° C.) | Dielectric Constant (Frequency, c.p.s.) | | |
|---|---|---|---|---|
| | | $(10^2)$ | $(10^3)$ | $(10^4)$ |
| 65 | 30 | 19.51 | 19.49 | 19.40 |
|    | 96 | 20.18 | 20.00 | 19.90 |
| 70 | 25 | 21.22 | 21.20 | 21.18 |
|    | 95 | 21.77 | 21.75 | 21.72 |
| 70* | 30 | 21.18 | 21.04 | 20.96 |
|     | 94 | 21.80 | 21.76 | 21.72 |
| 75 | 26 | 21.41 | 21.32 | 21.21 |
|    | 96 | 22.10 | 21.98 | 21.82 |
| 65 (0.1% Cu) | 30 | 18.95 | 18.90 | 18.82 |
|              | 96 | 19.41 | 19.33 | 19.22 |
| 65 (1% $Nd_2O_3$) | 25 | 18.45 | 18.39 | 18.34 |
|                   | 111 | 19.58 | 19.20 | 19.02 |

*Prepared from "spec-pure" $TeO_2$.

TABLE II.—DISSIPATION FACTORS AND RESISTIVITIES MEASURED AT 1 Kc.

| Sample, mol percent $TeO_2$ | Temperature, °C. | Dissipation factor, tan | Resistivity, ohm-cm.$^{-1}$ |
|---|---|---|---|
| 65 | 30 | 0.00263 | $3.45 \times 10^{10}$ |
|    | 96 | 0.00402 | $2.1 \times 10^{10}$ |
| 70 | 25 | 0.0016 | $5.43 \times 10^{10}$ |
|    | 95 | 0.0024 | $3.42 \times 10^{10}$ |
| 70* | 30 | 0.00274 | $2.97 \times 10^{10}$ |
|     | 94 | 0.0043 | $1.94 \times 10^{10}$ |
| 75 | 26 | 0.00237 | $3.50 \times 10^{10}$ |
|    | 96 | 0.0041 | $2.01 \times 10^{10}$ |
| 65 (0.1% $Cu^{2+}$) | 30 | 0.00169 | $5.58 \times 10^{10}$ |
|                    | 96 | 0.0029 | $3.17 \times 10^{10}$ |
| 65 (1% $Nd^{3+}$) | 25 | 0.00194 |  |
|                   | 111 | 0.00792 |  |

*Prepared from "spec-pure" $TeO_2$.

Figure 1:
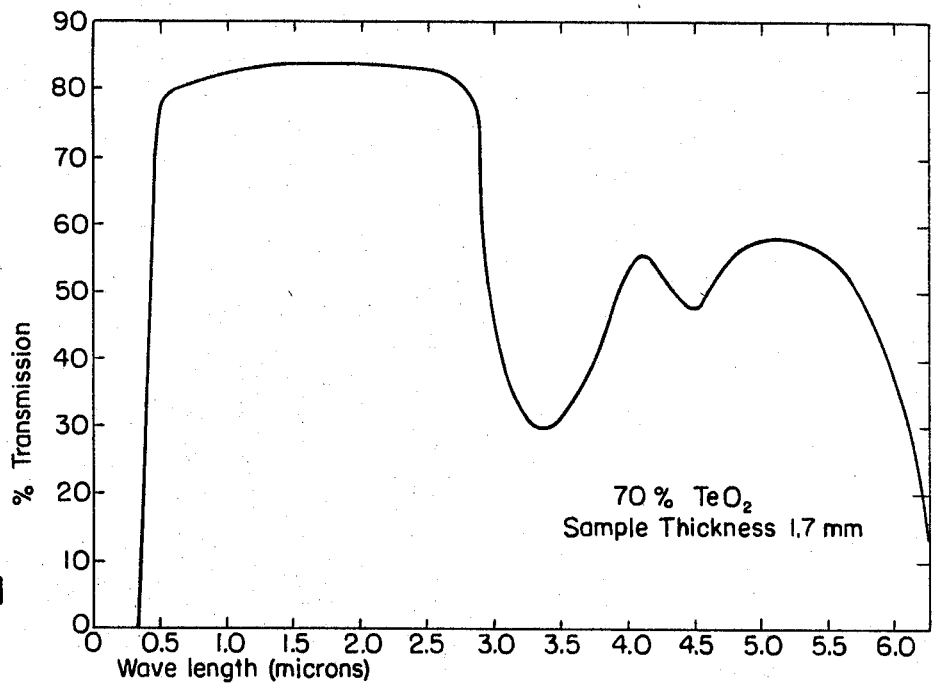

FIG. 1 of the drawings shows a transmission range for a typical glass containing 70% $TeO_2$, between 0.38 and $6.6\mu$ with two absorption bands at 3.35 and $4.5\mu$.

Figure 2:
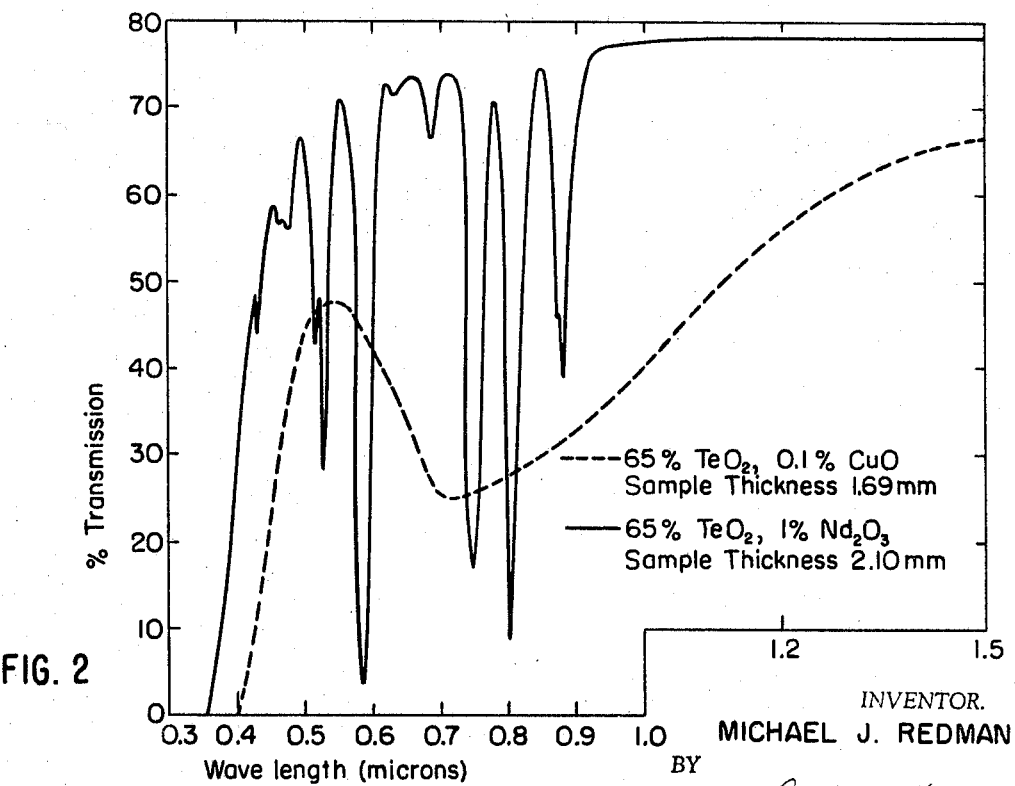

FIGURE 2 of the drawings shows the absorption spectra of $Cu^{2+}$ and $Nd^{3+}$ doped zinc tellurite glass. A similar $Nd^{3+}$ spectrum is observed for commercially available laser glasses with silicon and boron oxides as the main constituents.

The solubility of rare earth oxides, e.g. $Nd_2O_3$, in the $ZnO$-$TeO_2$ glasses of this invention ranges to more than 10% by weight of the final doped glass when starting with a 20 to 40 mol percent ZnO in a $ZnO$-$TeO_2$ mixture and substituting $Nd_2O_3$ for ZnO on an equal weight basis. This coupled with the broad transmissivity range provides an unusually favorable environment for stimulated emission. The glasses of this invention when doped with a rare earth oxide such as $Nd_2O_3$ appear to provide an excellent laser material, as shown by Table III in which the fluorescent characteristics of glasses of this invention are compared with a doped standard glass (American Optical #3538).

TABLE III

| Glass | Weight percent Nd | Conc. atoms Nd/cc. $\times 10^{-19}$ | Output $I_0\gamma_0$ | Output normalized to conc. of Nd, $\times 10^{-19}$ | $\gamma_0$ (time for drop in I from $I_0$ to $I_0^{-1}$) |
|---|---|---|---|---|---|
| AO #3538 | 5.0 | 47.2 | 42–48 | 0.9–1.0 | 500–600 |
| $ZnO:TeO_2$ (35:65 molar) | 1.1 | 20.9 | 75–82 | 3.6–3.9 | 150 |

In measuring the fluorescent activity of the glasses reported in Table III, a sample of glass is exposed to a beam of light from a xenon flash tube. The intensity I of fluorescent radiation normal to the beam is then measured and plotted against time $\tau$. The initial intensity at $\tau=0$ is $I_0$. The output is taken as $I_0\tau_0$ where the value of $\tau_0$ is the time for I to drop to $I_0 e^{-1}$.

The glasses of this invention may be manufactured by melting together a mixture of zinc oxide and tellurium oxide. The glass reported in Table III, consisting of 35 mol percent ZnO and 65 mol percent $TeO_2$, is made by mixing the ZnO and $TeO_2$ in the weight ratio of 21.5 ZnO to 78.5 $TeO_2$, melting them together in a platinum or other inert crucible over a gas flame and then cooling slowly, and annealing at 250–300° C. (which is below the transition temperature of 400° C.).

Doped glasses are prepared by adding $Nd_2O_3$ in an amount up to about 10% by weight, to the mixture prior to melting.

Preferably the tellurium oxide is purified prior to compounding, by dissolving it in an aqueous solution of sodium hydroxide, and filtering the solution. Hydrochloric acid is then added to reprecipitate the $TeO_2$, which is then filtered, rinsed with distilled water, and dried at 200° C.

From the foregoing data it will be seen that the glasses of this invention, upon excitation from a xenon flash lamp, emit far more effectively than the standard, notwithstanding a lesser dopant concentration.

Although this invention has been described with specific reference to the presently preferred embodiment, it is contemplated that modifications will readily occur to those skilled in the art and familiar with the principles herein set forth. For instance, it is contemplated that dopants other than Nd may be used, such as other rare earths or transition metals, or mixtures of them. Also, it is contemplated that additives normally employed in glass making may be used to improve glass forming properties of the compositions. Such modifications may be made without departing from the scope of this invention.

Having thus disclosed my invention and described in detail preferred embodiments thereof I claim and desire to secure by Letters Patent:

1. Zinc tellurite glasses consisting essentially of a major molar proportion of $TeO_2$ and between about 20 and about 40 molar percent of ZnO.

2. Fluorescent glass as defined by claim 1 containing a rare earth metal oxide in an amount sufficient for fluorescent activity.

3. Fluorescent glass as defined by claim 2 containing $Nd_2O_3$ in an amount sufficient for fluorescent activity.

References Cited

UNITED STATES PATENTS

| 2,763,559 | 9/1956 | Weissenberg et al. | 106—47 |
| 2,978,417 | 4/1961 | Larach | 252—301.6 |

FOREIGN PATENTS

| 81,391 | 5/1956 | Netherlands. |

OTHER REFERENCES

Stanworth: "Tellurite Glasses," J. Soc. Glass Tech., vol. 36 (1952), pp. 217–241, TP 845 S 678.

HELEN M. McCARTHY, *Primary Examiner.*

U.S. Cl. X.R.

106—47